Nov. 5, 1963 R. B. WISEMAN 3,109,222

METALWORKING TOOL

Filed Sept. 21, 1961

INVENTOR.
RUSSELL B. WISEMAN
BY
ATTORNEYS

United States Patent Office 3,109,222
Patented Nov. 5, 1963

3,109,222
METALWORKING TOOL
Russell B. Wiseman, 2395 Tustin Ave., Costa Mesa, Calif.
Filed Sept. 21, 1961, Ser. No. 139,700
4 Claims. (Cl. 29—95)

The present invention relates to metalworking tools by themselves and in assembly with chucks in which they are held in operative positions.

It is an object of the present invention to provide metalworking tools having improved clamping base structure by which they are adaptable for use in either fixed or rotary chuck assemblies.

Another object of the present invention is the provision of metalworking tools adapted to be clamped in assembly with chucks without interference between the chuck and the shank or between the workpiece and the shank.

Still another object of the present invention is the provision of metalworking tools in which the shanks can be as short as described.

A further object of the present invention is the provision of metalworking tool and chuck assemblies in which the tool may be clamped firmly and may be used without chattering.

Finally, it is an object of the present invention to provide metalworking tools, and metalworking tool and chuck assemblies, which will be relatively easy and inexpensive to manufacture, simple to operate, adjust, maintain and repair, and rugged and durable in use.

Other objects and advantages of the present invention will become apparent from a consideration of the following description, taken in connection with the accompanying drawing, in which.

Figure 1:
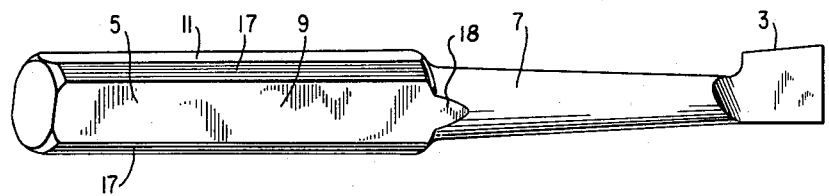
FIGURE 1 is a perspective view of a metalworking tool according to the present invention.

Referring now to the drawing in greater detail, there is shown an elongated metalworking tool indicated generally at 1 and having at one end thereof a cutting edge 3 and at the other end thereof a clamping base 5. A shank 7 intermediate the ends of tool 1 extends generally between and interconnects cuting edge 3 and clamping base 5.

Clamping base 5 is enlarged relative to shank 7 and is provided with a plurality of flat sides 9, 11, 13 and 15. Sides 9 and 13 are of the same width as each other and are substantially wider than sides 11 and 15, which are also of the same width as each other. Sides 9 and 13 are parallel to each other, as are also sides 11 and 15, and sides 9 and 13 are perdendicular to sides 11 and 15.

Figure 2:
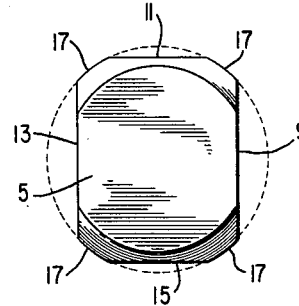
FIGURE 2 is an enlarged butt end view of the tool of FIGURE 1.

Sides 9, 11, 13 and 15, however, are spaced apart peripherally about clamping base 5 by four cylindrical segments 17 which lie on the surface of an imaginary cylinder shown in phantom line in FIGURE 2. The axis of this imaginary cylinder is coincident with the axis of tool 1 and is parallel to each of flat sides 9, 11, 13 and 15. The distance between sides 9 and 13 is considerably less than the distance between sides 11 and 15, so that roughly speaking clamping base 5 has a generally rectangular cross section of which the edges are truncated by coaxial arcs. The distance between sides 9 and 13, and even more so the greater distance between sides 11 and 15, is greater than the diameter of shank 7.

It is very important to notice that the imaginary cylinder on which cylindrical segments 17 lie is coaxial to all cross sections of shank 7 and substantially larger in diameter than any of them. It is also quite important to notice that apart from cutting edge 3, the planes of sides 9, 11, 13 and 15 lie on boundary contours of the tool base and shank. That is to say that no portion of base 5 or shank 7 extends outside the planes of those sides. If as in the illustrated embodiment, sides 9 and 13 are spaced apart a distance less than the greatest diameter of shank 7 at the base thereof, then the boundary contour relationship of the uniplanar sides is preserved as shown in FIGURE 1, by extending sides 9 and 13 endwise along shank 7 toward cutting edge 3, so that sides 9 and 13 lie not only along substantially the full length of base 5, but also extend a substantial distance along shank 7. This extended portion of sides 9 and 13 is shown in FIGURE 1 at 18, it being understood that if the outer contour of shank 7 is conical and portion 18 is uniplanar in a plane parallel to the axis of the cone of shank 7, then the outer contour of portion 18 will be a hyperbola.

It will thus be appreciated that a very unique relationship of parts is presented by the present invention, in which a plurality of uniplanar base sides parallel to the axis of the tool is presented, these being outer contours of the tool proper and being spaced apart by cylindrical sections, the diameter of the cylinder being substantially greater than any other diameter of a circular portion of the tool. At the same time, opposed pairs of the flat surfaces may be desirably spaced apart by extending them along not only the base of the tool but also a portion of the shank, the portions of the flat surfaces which overlie the shank being spaced apart by the natural curvature of the shank. In the case of the illustrated embodiment, in which the shank is tapered, the portions 18 are automatically spaced apart and maintained as boundary contours of shank 7 by the taper of shank 7, without the need for cutting away other portions of shank 7 and without the need for extending portions 18 unduly far toward cutting edge 3.

It is also an important feature of the present invention that a shoulder is provided between base 5 and shank 7, as shown in FIGURE 1, and this shoulder marks not only the delineation between the imaginary cylinder on which segments 17 lie, on the one hand, and the taper of shank 7, on the other hand, but also this shoulder serves as the delineation between the main portions of sides 9, 11, 13 and 15 proper, which have straight parallel edges, on the one hand, and portions 18 that have convergent, generally V-shaped edges, on the other hand.

Figure 3:
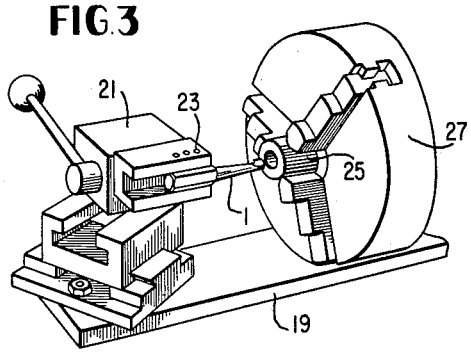
FIGURE 3 is a perspective view of one of the environments in which a metalworking tool according to the present invention may be used.
Figure 3:
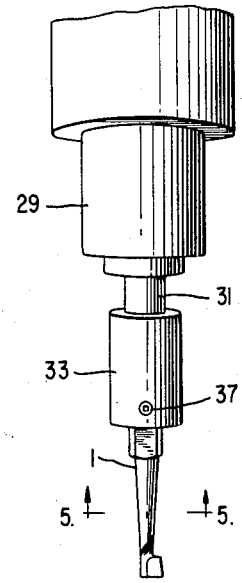

One of the principal features of the present invention is that tools according to the present invention may be used alternatively in engine lathes, turret lathes, jig bores, boring heads or boring machines. Thus, the tool of the present invention is virtually a universal metalworking tool. This is so because of the arrangement of the flat sides and the cylindrical segments on the clamping base and their relationship to the rest of the tool. The usefulness of this relationship is illustrated by comparison between FIGURES 3 and 4, in which two entirely different environments for use of the tool of the present invention are shown. In FIGURE 3, there is shown a lathe 19 having a tool holder 21 in which a tool 1 is clamped. The flat sides of the clamping base of the tool are parallel or perpendicular to the clamping surfaces of the tool holder, and setscrews 23 extend through the tool holder and contact one of flat sides 9–15 releasably to hold the tool in the tool holder with the opposed face in contact with the flat surface of the tool holder. Depending on the size of the tool holder, the tool can be turned so that sides 9 and 13 are horizontal, or so that sides 11 and 15 are horizontal, thereby to present to the tool holder a clamping base of selected diameter between opposed parallel sides of the clamping base. The tool is thus firmly clamped for performing a metalworking operation on a workpiece 25 held in a work holder 27 on the lathe.

Figure 4:
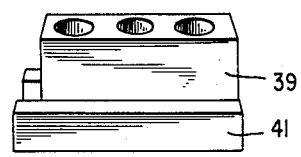
FIGURE 4 is a view similar to FIGURE 3 but showing another environment in which the tool of the present invention may be used.

Another environment in which the present invention is useful is shown in FIGURE 4 in the form of a rotary boring machine 29 having a boring head 31 terminating downward in a chuck 33 having a workpiece holding socket 35. Socket 35 has an inner contour that is cylindrical about a vertical axis as seen in FIGURE 4. When a tool 1 is selected for socket 35, it is selected so that the imaginary cylinder that defines the four cylindrical segments about the periphery of the clamping base of the tool is of a diameter just slightly less than the diameter of the inner cylindrical contour of socket 35. The tool in socket 35 will thus have the appearance shown in FIGURE 5 when seen from below. In order to lock the tool in the socket, a setscrew 37 extends through the side wall of the chuck and socket radially of the axis of the inner cylindrical contour of the socket thereby releasably to lock the tool in the socket for the performance of a metalworking operation on a workpiece 39 firmly held below the tool by a work holder 41.

Figure 5:
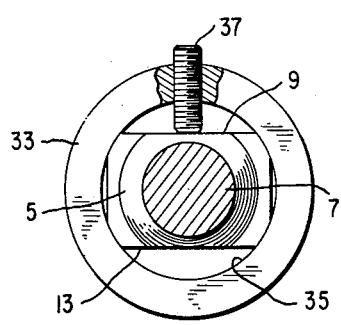
FIGURE 5 is a cross-sectional view on the line 5—5 of FIGURE 4 looking in the direction of the arrows and showing the novel tool and chuck assembly of the present invention.

In connection with the tool and chuck assembly shown in FIGURES 4 and 5, it is very important to note the relationship of the tool to the socket and to the setscrew that holds it in the socket. As seen in FIGURE 5, setscrew 37 bears against side 9, and this forces the tool toward the other side of the socket. At the other side of the socket, however, the tool finds support on the two cylindrical segments 17 which lie one on either side of opposed flat side 13. Thus, there is in effect a three-point clamping action between the point of setscrew 37 and the two cylindrical segments on either side of side 13. This three-point clamping action, which of course is actually between a point and two parallel opposed lines or strips, makes for a very strong and firm clamping of the tool within the chuck and prevents chattering of the tool during the work operation performed on workpiece 39 held in work holder 41.

It will also be appreciated that it is important that the diameter of shank 7 be less than the distance between sides 11 and 15, or even between sides 9 and 13, for in this way the tool may be received as deeply in the chuck as is desired without interference between the tool and the chuck regardless of whether the chuck is fixed as in FIGURE 3 or removable as in FIGURES 4 and 5 or of other types. Moreover, the provision of the shank relatively reduced compared to the base portion assures that the base portion may be made sufficiently large to provide suitably firm clamping without at the same time having a shank so large as to interfere with the metalworking operation. Thus, the shank may be made as short as desired with regard either to working edge clearance or to chuck clearance.

This application is a continuation-in-part of application Serial No. 72,383, filed November 29, 1960, and now abandoned.

From a consideration of the foregoing disclosure, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A metalworking tool adapted to be clamped selectively in a stationary or in a movable chuck, comprising an elongated metal tool having a metalworking edge at one end and a clamping base at the other end and a shank between the ends, the clamping base having at least three uniplanar sides extending full length thereof and spaced apart about the periphery of the clamping base by at least three spaced segments of substantial width of a common cylinder of which the axis is parallel to each of the uniplanar sides and of which the diameter is substantially greater than any diameter of the shank, at least two of the sides being parallel to each other.

2. A metalworking tool as claimed in claim 1, the sides being four in number and the sides of each opposed pair of sides being parallel to each other, one said pair of opposed sides being spaced apart a distance distinctively different from the distance between the sides comprising the other pair of opposed sides.

3. A metalworking tool as claimed in claim 1, a pair of said parallel sides being spaced apart a distance less than the diameter of the shank adjacent the base and overlying a portion of the shank.

4. A metalworking tool as claimed in claim 1, a pair of said parallel sides being spaced apart a distance greater than any diameter of the shank.

References Cited in the file of this patent

UNITED STATES PATENTS

| | | |
|---|---|---|
| 525,116 | Richards | Aug. 28, 1894 |
| 1,231,347 | Heiser | June 26, 1917 |
| 2,293,680 | Beyreis | Aug. 18, 1942 |
| 2,362,053 | Danielson | Nov. 7, 1944 |
| 2,541,196 | Braque | Feb. 13, 1951 |
| 2,700,549 | Coronett | Jan. 25, 1955 |
| 2,775,821 | Eipper | Jan. 1, 1957 |
| 2,836,426 | Crawford | May 27, 1958 |
| 2,931,254 | Briney | Apr. 5, 1960 |

FOREIGN PATENTS

| | | |
|---|---|---|
| 474,318 | Canada | June 12, 1951 |
| 755,622 | Great Britain | Aug. 22, 1956 |